United States Patent [19]

MacPhee et al.

[11] Patent Number: 4,689,385

[45] Date of Patent: Aug. 25, 1987

[54] POLYURETHANE-BASED ELASTOMERIC MATERIAL

[75] Inventors: Kenneth E. MacPhee, Guelph; John L. Barton, Sherwood Park, both of Canada

[73] Assignee: Her Majesty the Queen in right of Canada, as represented by Minister of National Defence of Her Majesty's Canadian Government, Canada

[21] Appl. No.: 870,991

[22] Filed: Jun. 5, 1986

[30] Foreign Application Priority Data

Jan. 8, 1986 [CA] Canada ................................. 499244

[51] Int. Cl.$^4$ .............................................. C08G 18/32
[52] U.S. Cl. ........................................ 528/58; 528/55; 528/67; 528/76; 528/80; 528/83

[58] Field of Search ....................... 528/58, 67, 76, 80, 528/83, 55

[56] References Cited

U.S. PATENT DOCUMENTS

| | | | |
|---|---|---|---|
| 4,203,875 | 5/1980 | Garner et al. | 528/58 |
| 4,303,773 | 12/1981 | Ganster et al. | 528/58 |
| 4,588,802 | 5/1986 | Chang | 528/58 |

*Primary Examiner*—Maurice J. Welsh
*Attorney, Agent, or Firm*—Nixon & Vanderhye

[57] ABSTRACT

The invention disclosed relates to an elastomeric polyurethane-based material which is resistant to penetration by chemical-warfare agents and as such is suitable for use in protective clothing such as facemasks. The novel materials are made according to a process which comprises reacting a saturated hydroxyl-terminated polyol with a polyisocyanate.

18 Claims, No Drawings

POLYURETHANE-BASED ELASTOMERIC MATERIAL

This invention relates to an elastomeric polyurethane-based material suitable for use in protective clothing such as facemasks, which resists penetration by chemical warfare (CW) agents and exhibits other desirable physical properties.

A typical facemask includes a facepiece which covers the whole face and forms an air-tight seal against the valve, speech transmitter and nosecup. Air is drawn into the mask through a filter canister, past the visor into the nosecup and into the lungs. On exhalation, the air passes out of the lungs, into the nosecup and out through the outlet valve. The mask protects the face, eyes and respiratory tract from chemical and biological warfare (CW) agents. CW agents include dichlorodiethyl sulphide, commonly known as mustard gas or H-agent. These agents may be in solid, liquid, vapour or aerosol form. They can enter the body through the respiratory tract or be absorbed through the skin or eyes and are effective at very low concentrations.

Existing facemasks are generally made of natural rubber materials compounded for injection moulding. Such materials require improvement in their physical properties and CW agent penetration resistance.

According to the invention, applicant has developed novel polyurethane-based elastomeric materials made according to a process which comprises reacting (a) a saturated hydroxyl-terminated polyol selected from the group consisting of polyesters, polyether glycols, polycaprolactones and polycarbonates, with (b) a polyisocyanate.

Optionally, a chain extender is employed such as a short-chain alcohol, preferably 1,4-butanediol. The reaction is preferably catalyzed by a suitable catalyst, preferably by an organo-metallic compound. The polyol is preferably a linear difunctional alcohol. The polyisocyanate is preferably one which contains 4,4'-diphenylmethane diisocyanate (MDI) as its major component.

The chemical reaction involved is generally described as follows:

$$n(OH-R-OH) + n(OCN-R'-NCO) \longrightarrow$$

$$OCN + RNH-CO-O-R'-O-CO-NH)_{n-1}-R$$
$$|$$
$$HO-R'-O-CO-NH$$

wherein n is an integer which is the same for the difunctional alcohol as the polyfunctional isocyanate; and wherein R is the descriptor for a saturated hydroxyl-terminated, linear polyester, polyether glycol, polycaprolactone or polycarbonate; and wherein R' is the descriptor for a polyisocyanate, preferably one which contains 4,4'-diphenylmethane diisocyanate (MDI) as its major component.

TABLE 1

Types of Polyols in various formulations

| Formulation No. | Type | Backbone structure | Trade name/Grade** | Hydroxyl No. | Equivalent+ Weight |
|---|---|---|---|---|---|
| UDC-001 | Ester | Poly (1,4 butane adipate) | Formrez ® 44-112 | 113.79 | 493.01 |
| UDC-002 | Ester | Poly (ethylene adipate) | Formrez ® 22-112 | 111.34 | 503.86 |
| UDC-003 | Carbonate | Poly (carbonate) | Vulkollan ® 2020 | ? | 1,000* |
| UDC-004/UDC-005 | Caprolactone | Poly (caprolactone) | Niax ® PCP-0210 | 133 | 421.80 |
| UDC-006 | Ether | Poly tetramethylene glycol ether | Teracol ® 650 | 174.5 | 321.49 |
| UDC-007 | Ether | Poly tetramethylene glycol ether | Polymeg ® 2000 | 57.0 | 984.21 |
| UDC-008 | Ester | Poly (ethylene adipate) | Formrez ® 22-56 | 56.31 | 996.27 |
| UDC-009 | Ester | Poly (1,4 butane adipate) | Formrez ® 44-56 | 56.21 | 998.04 |
| UDC-010 | Ester | Poly (ethylene/1,4 butane adipate) | Formrez ® E24-56 | 54.01 | 1038.70 |

+Calculated using given hydroxyl numbers: Equivalent weight = 56,100/Hydroxyl No. (56,100 is the mol. wt. in mg of KOH)
*Assumed number
**See Table 5 for sources

TABLE 2

Formulation & fabrication details
(For selected primary & secondary screened specimens)

| Formulation No. | Eq. wt. ratio of Polyol/Isocyanate/Extender) | Polyol type (100 g each) | Catalyst* amount (drops) | Diisocyanate** Type | Diisocyanate** Amount (g) | Chain Extender*** (1,4 Butanediol) (g) | Pot Life (min) | Demould time (min) |
|---|---|---|---|---|---|---|---|---|
| UDC-001 | 1:1:0 | Formrez ® 44-112 | 5 | Isonate ® 143L | 29.37 | 0 | 7.5 | 12.0 |
| UDC-002 | 1:1:0 | Formrez ® 22-112 | 3 | Isonate ® 143L | 28.74 | 0 | 6.5 | 3.5 |
| UDC-003 | 1:2:1 | Vulkollan ® 2020 | 0 | Isonate ® 143L | 28.96 | 4.50 | 15 | 28.0 |
| UDC-004 | 1:1:0 | Niax ® PCP-0210 | 2 | Isonate ® 143L | 34.33 | 0 | 7 | 14.5 |
| UDC-004 | 1:1.5:0.5 | Niax ® PCP-0210 | 2 | Isonate ® 143L | 53.82 | 5.58 | 6.5 | 12.0 |
| UDC-005 | 1:1:0 | Niax ® PCP-0210 | 4 | Isonate ® 181 | 43.74 | 0 | 8.5 | 16.0 |
| UDC-006 | 1:1:0 | Teracol ® 650 | 1 | Isonate ® 143L | 45.04 | 0 | 6.5 | 14.5 |
| UDC-007 | 1:2:1 | Polymeg ® 2000 | 2 | Isonate ® 143L | 29.42 | 4.57 | 3.5 | 8.0 |
| UDC-008 | 1:2:1 | Formrez ® 2256 | 3 | Isonate ® 143L | 29.07 | 4.51 | 6 | 12.0 |
| UDC-009 | 1:2:1 | Formrez ® 4456 | 2 | Isonate ® 143L | 29.02 | 4.51 | 4.5 | 8.5 |
| UDC-010 | 1:2:1 | Formrez ® E-24-56 | 3 | Isonate ® 143L | 27.88 | 4.33 | 5 | 10.0 |
| UDC-010 | 1:1.5:0.5 | Formrez ® E-24-56 | 3 | Isonate ® 143L | 20.91 | 2.17 | 4.5 | 8.0 |

All formulations were cast in moulds and cured at 100° C. for 16 hours in an air-circulating oven.
*Fascat ® 4200 An esterification catalyst with 33% Sn; dibutyltin diacetate $(C_4H_9)_2Sn(CH_3COO)_2$ Mol. Wt. 351 diluted 20:1 with Dimethyl ethyl phthalate (DMEP).
**Isonate ® 143L or 181 4,4'diphenylmethane diisocyanate (MDI) based products (for details see Table 6) Eq. wt. of 143L = 144.8; of 181 = 184.5
***1,4 Butanediol Eq. wt. 45; BASF or DuPont's grades used

TABLE 3

Initial Formulation Study - Primary Screening
(Specimens unaged)

| Formulation No. | Eq. wt. ratio of (Polyol/Isocyanate/Extender) | Hardness (Shore A) | Tear Strength (Split) (PLI) | 100% Modulus (PSI) | 300% Modulus (PSI) | UTS (PSI) | E/B (%) |
|---|---|---|---|---|---|---|---|
| UDC-001 | 1:1:0 | 63 | 38 | 326 | 501 | 3224 | 480 |
| -002 | 1:1:0 | 59 | 43 | 291 | 447 | 4003 | 630 |
| -003 | 1:2:1 | 74 | 72 | 458 | 1683 | 3308 | 363 |
| -004 | 1:1:0 | 57 | 17 | 288 | 414 | 2290 | 530 |
| -005 | 1:1:0 | 63 | 27 | 351 | 382 | 1334 | 800 |
| -006 | 1:1:0 | 63 | 13 | 342 | 594 | 1080 | 360 |
| -007 | 1:2:1 | 67 | 23 | 436 | 816 | 1024 | 360 |
| -008 | 1:2:1 | 58 | 65 | 358 | 508 | 3627 | 665 |
| -009 | 1:2:1 | 64 | 76 | 469 | 1338 | 4511 | 410 |

Notes:
1. UTS: Ultimate tensile strength
2. E/B: Elongation at break (ultimate)
3. Generally the observations are averages of 3 readings; coefficient of variations being less than 5% in most cases.

TABLE 3-A

PENETRATION RESISTANCE AGAINST MUSTARD GAS

1. Nine samples of candidate urethane formulations have been tested against mustard at 30° C. using five-1 μl drops in a closed cell.
2. Total penetrations at 24 h and sample thickness are given in the table below:

| Sample No. | Thickness (inches) | Penetration (μg) |
|---|---|---|
| UDC 001 | 0.076 | 0 |
| UDC 002 | 0.140 | 0 |
| UDC 003 | 0.106 | 0 |
| UDC 004 | 0.105 | 0 |
| UDC 005 | 0.122 | 0 |
| UDC 006 | 0.083 | 0 |
| UDC 007 | 0.118 | 6 |
| UDC 008 | 0.131 | 0 |
| UDC 009 | 0.126 | 0 |

3. All samples except 007 gave zero penetration and even 6 μg is marginally acceptable.

TABLE 4

Initial Formulation Study - Secondary Screening

| Formulation (Eq. wt. ratio of components) | HARDNESS Unaged (Shore A) | Aged-1 | Aged-2 | Aged-3 | TEAR STRENGTH (SPLIT) Unaged (PLI) | Aged-1 | Aged-2 | Aged-3 | TEAR STRENGTH (DIE C) Unaged (PLI) | Aged-1 | Aged-2 | Aged-3 |
|---|---|---|---|---|---|---|---|---|---|---|---|---|
| UDC-004 (1:2:1) | 84 | 77 | 76 | 80 | 84 | 33 | 34 | 69 | 423 | 244 | 267 | 401 |
| (1:1.75:0.75) | 75 | 72 | 69 | 74 | 61 | 27 | 30 | 49 | 344 | 198 | 220 | 329 |
| (1:1.5:0.5) | 63 | 64 | 62 | 66 | 51 | 32 | 18 | 34 | 205 | 148 | 180 | 175 |
| (1:1:0) | 55 | 59 | 63 | 64 | 29 | 20 | 16 | 28 | 93 | 139 | 177 | 135 |
| USC-008 (1:2:1) | 57 | 58 | 56 | 63 | 49 | 28 | 37 | 54 | 227 | 161 | 272 | 290 |
| (1:1.75:0.75) | 53 | 57 | 61 | 60 | 35 | 25 | 31 | 52 | 173 | 141 | 204 | 234 |
| (1:1.5:0.5) | 45 | 51 | 54 | 55 | 21 | 27 | 26 | 45 | 69 | 109 | 172 | 185 |
| UDC-009 (1:2:1) | 69 | 65 | 66 | 68 | 52 | 39 | 55 | 55 | 324 | 217 | 272 | 302 |
| (1:1.75:0.75) | 78 | 63 | 64 | 69 | 79 | 43 | 46 | 52 | 360 | 191 | 205 | 253 |
| (1:1.5:0.5) | 95 | 62 | 85 | 68 | 116 | 41 | 65 | 48 | 477 | 157 | 249 | 189 |
| UDC-010 (1:2:1) | 64 | 61 | 61 | 63 | 45 | 31 | 25 | 44 | 253 | 193 | 221 | 248 |
| (1:1.75:0.75) | 62 | 60 | 60 | 65 | 35 | 23 | 24 | 37 | 223 | 187 | 219 | 225 |
| (1:1.5:0.5) | 59 | 58 | 58 | 60 | 41 | 33 | 38 | 43 | 191 | 175 | 197 | 199 |

| Formulation (Eq. wt. ratio of components) | 100% MODULUS Unaged (PSI) | Aged-1 | Aged-2 | Aged-3 | 300% MODULUS Unaged (PSI) | Aged-1 | Aged-2 | Aged-3 | UTS Unaged (PSI) | Aged-1 | Aged-2 | Aged-3 |
|---|---|---|---|---|---|---|---|---|---|---|---|---|
| UDC-004 (1:2:1) | 1038 | 522 | 652 | 870 | 3246 | 2278 | — | 5099 | 3176 | 2603 | 2147 | 5578 |
| (1:1.75:0.75) | 719 | 419 | 434 | 537 | 1910 | 1327 | — | 2372 | 3276 | 2003 | 1361 | 3671 |
| (1:1.5:0.5) | 438 | 323 | 330 | 346 | 723 | 563 | 750 | 627 | 1840 | 1264 | 2101 | 2588 |
| (1:1:0) | 271 | 305 | 298 | 302 | 312 | 401 | 510 | 373 | 643 | 1029 | 1803 | 1195 |
| USC-008 (1:2:1) | 372 | 243 | 318 | * | 595 | 336 | 629 | * | 2527 | 1403 | 2785 | * |
| (1:1.75:0.75) | 357 | 256 | 315 | * | 443 | 346 | 520 | * | 1701 | 2164+ | 3530 | * |
| (1:1.5:0.5) | 242 | 239 | 307 | * | 280 | 263 | 425 | * | 637 | 850+ | 2005 | * |
| UDC-009 (1:2:1) | 502 | 336 | 381 | 406 | 960 | 649 | 863 | 1395 | 3886 | 2315 | 3321 | 4240 |
| (1:1.75:0.75) | 670 | 327 | 349 | 346 | 1061 | 643 | 677 | 796 | 4372 | 2753 | 3569 | 4149 |
| (1:1.5:0.5) | 1151 | 287 | 430 | 306 | 1216 | 367 | 840 | 392 | 6718 | 2766 | 4073 | 3930 |
| UDC-010 (1:2:1) | 460 | 325 | 328 | 365 | 699 | 476 | 573 | 641 | 3497 | 2022 | 2973 | 3081 |
| (1:1.75:0.75) | 450 | 335 | 352 | 409 | 613 | 477 | 563 | 595 | 2657 | 2128 | 3279 | 3493 |
| (1:1.5:0.5) | 375 | 314 | 297 | 378 | 477 | 433 | 426 | 489 | 1703 | 1795 | 2057+ | 2737+ |

| Formulation (Eq. wt. ratio) of components | E/B Unaged (%) | Aged-1 | Aged-2 | Aged-3 | REBOUND RESILIENCE Unaged (%) | Aged-1 | Aged-2 | Aged-3 | ROSS FLEX TESTER No of cycles at the following Cut Growth 100% | 200% | 300% | 400% | Fail |
|---|---|---|---|---|---|---|---|---|---|---|---|---|---|
| UDC-004 (1:2:1) | 263 | 303 | 210 | 297 | 10 | 3 | 4 | 7 | 5,600 | 13,025 | 15,200 | 23,500 | 34,500 |

TABLE 4-continued

| | | | | | | | | | | | | | | |
|---|---|---|---|---|---|---|---|---|---|---|---|---|---|---|
| | (1:1.75:0.75) | 350 | 340 | 257 | 317 | 8 | 5 | 7 | 3 | — | 15,360 | 25,500 | 30,380 | 49,500 |
| | (1:1.5:0.5) | 447 | 403 | 387 | 457 | 15 | 17 | 16 | 5 | — | 19,900 | 26,650 | 34,875 | 52,300 |
| | (1:1:0) | 630 | 503 | 430 | 555 | 44 | 53 | 41 | 39 | | No cut growth to 118,000 | | | |
| UDC-008 | (1:2:1) | 640 | 597 | 510 | * | 39 | 47 | 36 | 38 | | " | | | |
| | (1:1.75:0.75) | 595 | 620+ | 547 | * | 38 | 46 | 38 | 41 | | " | | | |
| | (1:1.5:0.5) | 680 | 717+ | 490 | * | — | 55 | 44 | 46 | | " | | | |
| UDC-009 | (1:2:1) | 463 | 433 | 437 | 407 | 51 | 64 | 53 | 66 | 30,400 | 55,600 | 67,320 | 81,300 | no failure at 118,000 |
| | (1:1.75:0.75) | 453 | 437 | 453 | 483 | — | 63 | 57 | 57 | — | 2,600 | — | 5,300 | 14,100 |
| | (1:1.5:0.5) | 527 | 570 | 487 | 557 | 26 | 64 | 47 | 55 | | Too stiff to test | | | |
| UDC-010 | (1:2:1) | 550 | 613 | 530 | 470 | 44 | 53 | 45 | 43 | 18,560 | 69,300 | 85,000 | — | no failure at 118,000 |
| | (1:1.75:0.75) | 580 | 610 | 547 | 620+ | 47 | 55 | 46 | 32 | | No cut growth to 118,000 | | | |
| | (1:1.5:0.5) | 620 | 597 | 560+ | 670+ | 42 | 69 | 55 | 55 | | " | | | |

Age-1: aging in boiling water for 1 hour
2: aging in boiling water for 4 hours
3: aging at 80° C. for 96 hours (air-circulating oven)
*Specimens slipped from Instron jaws
+Specimens did not break within the limits of Instron jaw separation
NOTE:
Generally, the observations are averages of 3 readings; coefficient of variations being less than 5% in most cases

TABLE 5

CHEMICAL INGREDIENTS AND SOURCES

| COMPONENT | TRADE NAME | GRADE | SUPPLIER |
|---|---|---|---|
| 1. Polyol (see Table 1 for further details) | Formrez ® | 22-56, 44-56, E24-56, 22-112, 44-112 | Witco Chemical |
| | Niax ® | PCP-0210, PCP-0240 | Union Carbide |
| | Vulkollan ® | 2020 | Bayer |
| | Teracol ® | 650, 1000, 2000 | DuPont |
| | Polymeg ® | 650, 1000, 2000 | Quaker |
| | Rucoflex ® | S1037110, S101110, S103755, S10155 S1017110, S101755, S1011110, S101055 | Ruco Polymer Corp. |
| | Poly-G ® | 20112, 20265, 2037, 2028, 2056 | Olin Chemicals |
| 2. Diisocyanate (MDI) | Isonate | 240, 125M, 181, 143 L (See Appendix II) | Upjohn Polymer Chem. |
| 3. Catalyst | Fascat ® 4200 | Organo-tin | M & T Chem. Corp. |
| | T-9, T-12 | " | M & T Chem. Corp. |
| | Cocure ® | 32, 44 organo-mercury | Cosan Chem. Corp. |
| 4. Chain Extender (Hardener/ Curative) | 1,4 Butane Diol | | DuPont or BASF WYANDOTTE Corp. |
| | Trimethylol propane | | Celanese |
| | 1,3 Butylene glycol | | Celanese |
| | Isonol | 93 | Upjohn Polymer Chem. |

TABLE 6

DETAILS OF DIISOCYANATES ISONATE 143L AND 181

1. Isonate 143 L (Eq. wt. 144.8) is a mixture of the following three products, MDI, a carbodiimide and a polyfunctional cycloadduct. Thus, 143 L is not a true diisocyanate since its Thus, 143 L is not a true diisocyanate since its functionality is slighlty greater than 2. Accordingly, the term polyisocyanate is better descriptive of this product.

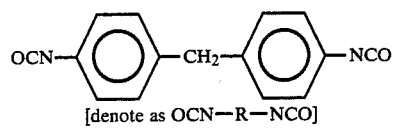

[denote as OCN—R—NCO]

4,4' diphenylmethane diisocyanate (MDI)

[OCN—R—N=C=N—R—NCO]
carbodiimide

TABLE 6-continued

DETAILS OF DIISOCYANATES ISONATE 143L AND 181

>90° C. <90° C.

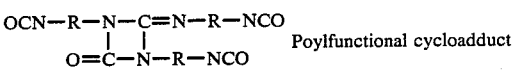

Poylfunctional cycloadduct

2. Isonate 181 is approximately 50% (by wt.) pure MDI while the rest is difunctional (—NCO terminated) urethanes 600-1000 mol. wt. obtained by reacting with specific glycol ethers.

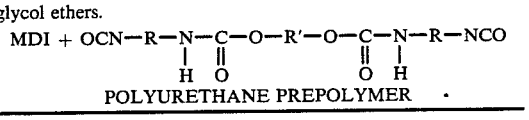

POLYURETHANE PREPOLYMER

The reactant diols, polyisocyanates, chain-extenders and catalyst systems were investigated to come up with workable and practical systems in terms of "pot-life", "demoulding time" and "cure time".

All the mixing of the reactants was accomplished in one pint tin cans which were considered to be practical in terms of cost and disposability. Generally, the commercial polyols investigated ware available in solid resinous state and it was necessary to melt them in an oven at 100° C. to facilitate pouring. One hundred gram samples of polyols were selected as the basis of formulation work and depending on the viscosity of resins, the tin containers were either placed directly in a vacuum chamber for degassing or following a warm-up period in an oven at 100° C. Degassing of reactants is an important step in ensuring the removal of dissolved air. Dissolved excessive gases in the reactants will cause frothing and voids in the curing urethane under conditions of heat cure. Polyol samples were degassed until no visible bubbling was evident at which point the required catalyst amount (see below) was added using a capillary pipette. The mixture was then thoroughly stirred with a metal blade and then returned under vacuum in order to remove bubbles which may have occurred with the addition of the catalyst. Following this step, a weighed amount of the liquid isocyanate was added, the contents mixed thoroughly as before and the new mixture subjected to degassing as before. In formulations where the chain-extender was required, a pre-determined amount of 1,4-butanediol was then added, mixed and degassed. Other diols such as HER and HQEE may also be employed. The mixture was now ready for pouring into a 6×6×0.125 inch mould preheated to 100° C. The moulds used in this study were all Teflon ® coated which made demoulding easy. Following the pouring of the mixture, the urethanes were flamed by rapidly passing a propane torch 5-6 inches above the mixture, so as to remove any remaining surface bubbles. The moulds were then placed in an oven at 100° C. to cure for 16 hours (overnight). Following cure, the specimens were placed for a week in a temperature and humidity controlled room for conditioning before final physical testing.

Reactants

Difunctional alcohols and polyisocyanates are the two basic building blocks of polyurethane elastomers. Commercially available, hydroxyl-terminated, saturated, linear difunctional alcohols of mol. wt. 2000 or less were selected. Of the common polyisocyanates, 4,4'-diphenylmethane diisocyanate (MDI) based reactants were preferred over toluene diisocyanate (TDI) due to the latter's higher volatility (and thus inherent toxicity). Difunctional alcohols and isocyanates, chain-extenders and catalyst systems included in various formulations are all listed in Table 5.

Catalyst Selection

The first step of the development work was to select a suitable catalyst from the commercially available organo-metallics acquired after discussions with the suppliers. A catalyst system was desired which would allow for a long enough pot life (5-15 min.) so that the mixtures could be adequately stirred, degassed and poured into moulds and yet a short enough demould time (<15 min.) so that the process would be economical in production.

An organo-tin catalyst, M & T "Fascat ® 4200" was investigated. The catalyst proved to be extremely reactive and had to be diluted 20:1 with dimethyl ethyl phthalate (DMEP). This degree of dilution was named in this study as "Fascat Mix" and was thereafter used as the catalyst in each of the formulations listed in Table 2.

Preliminary Formulation Studies

Polyols and polyisocyanates were mixed according to their equivalent weights to ensure complete polymerization. Equivalent weights of polyols were determined using their hydroxyl numbers provided by the resin suppliers (Table 1). Equivalent weights of other reactive components, namely polyisocyanates and 1,4 butanediol, are given in Table 2.

The commercially available polyols investigated were polyesters, polyethers, polycaprolactones and polycarbonates.

A large number of formulations were cast for initial physical property evaluation based on polyols (with mol. wt. 1000 or less; equivalent wt. 500 or less) mixed with the catalyst, Fascat ® 4200 mix and the MDI-based diisocyanate, Isonate ® 143 L. Later on, it was discovered that polyols of higher mol. wt. (2000) could be formulated using the same processing conditions, when a chain-extender such as 1,4-butanediol was included in the formulations.

Two other MDI-based isocyanates with higher isocyanate equivalents were investigated in various formulations. Isonate ® 181 L is a modified diphenyl methane diisocyanate containing a high percentage of MDI. The introduction of Isonate ® 181 L in the mix generally led to lower hardness and lower physical properties than those achieved with Isonate ® 143 L. Some of the compounds were too slow curing to demould. Tear strength values of the mixes based on Isonate ® 240 proved to be rather low. Isonate ® 143 L (Eq. wt. 144-8 is a mixture of MDI, a carbodiimide and a polyfunctional cycloadduct. Isonate ® 181 L is about 50%/w pure MDI while the rest is difunctional (-NCO terminated) urethanes 600-1000 MW obtained by reacting with specific glycol ethers.

From the experience gained through preliminary formulation work, nine formulations were chosen (primary screening) based on hardness, tensile and tear strength, and were reproduced and retested. The results are listed in Table 3 while formulation details are given in Tables 1-2.

These formulations represent four types of polyurethanes: polyesters, polyethers (PTMG), polycarbonates and polycaprolactones. Eight of the nine compositions used diisocyanate, Isonate ® 143 L, while the nineth utilized Isonate ® 181. Four of the nine mixes included the chain-extender, 1,4 butanediol. All of the formulations except the polycarbonate type were catalyzed using Fascat ® 4200 mix.

Following the completion of primary screening (Table 3), three formulations UDC-004, -008 and -009 were found superior and selected for further development work. The criteria of this selection was generally based on lower hardness range formulations with higher tear strengths whenever possible. One new compound, UDC-010, based on poly(ethylene/1,4 butane adipate) was also added to the list. These four compounds were then reformulated varying the amounts of the chain-extender, 1,4-butanediol in the mix (see Tables 1, 2 and 4).

The physical properties measured were Shore A hardness, tear strength (die C and split tear), resilience, and tensile properties. All these measurements were made on unaged as well as aged specimens. Aging conditions consisted of exposing the specimens for 1 to 4 hours in boiling water or subjecting them to 80° C. heat in an air-circulating oven for 96 hours. All specimens following their respective aging periods were conditioned at room temperature in a humidity controlled room for 24 hours before final physical property measurements. For a measure of flexibility and dynamic tear resistance, Ross Flex Tester (ASTM D-1052-55) was used to monitor cut growth. Arbitrarily and from previous experience, tests were limited to around 100,000 cycles maximum if no cut growth was observed. All these results are listed in Table 4.

From the results of secondary screening (Table 4), the following four formulations were chosen for detailed evaluations against penetration resistance to CW agents.

| UDC-004 | (1:1.5:0.5) | Equivalent weight ratios |
|---|---|---|
| UDC-008 | (1:2:1) | of polyol:isocyanate: |
| UDC-010 | (1:2:1 and 1:1.5:0.5) | 1,4-butanediol, respectively. |

Additionally, these four compounds were tested for Gehman, low temperature resistance (ASTM, D-1053). It was found that the compound UDC-004 is less flexible at lower temperatures than the other three.

All four compounds exhibited zero penetration against mustard gas.

DISCUSSION

The novel materials are representative of four types of polyurethanes: polyester, polyether, polycarbonate and polycaprolactone, ranging from 55-75 Shore A hardness. Shore A is a specific scale of hardness, and it provides a measure of the relative hardness (or softness) of the elastomer and indicates the degree of flexibility. Shore A 30 is very soft while Shore A 95 is very stiff and hard. We were looking for a material in the intermediate range, Shore A 55-75, which would be flexible enough to provide a good "face-seal" but also be strong enough to withstand abuse.

All of the formulations made use of the same MDI-based product, Isonate ® 143 L with one exception when a higher equivalent weight product, Isonate ® 181 L was evaluated. All of the formulations except the polycarbonate type were catalyzed using Fascat ® 4200 mix, an organo-tin product, diluted 20:1 with dimethyl ethyl phthalate.

Results of penetration resistance against mustard gas indicated that all the samples except UDC-007 exhibited zero penetration. The 6 μg penetration in the case of UDC-007 was considered marginally acceptable (Table 3A).

It was generally observed that polyols with mol. wt. around 1000 could be processed according to our selected conditions described above and with pot lives of 5-10 minutes. Although they yielded specimens with the desired lower range Shore A hardness values, the measured tear strength values were considered low.

The higher molecular weight (~2000) polyols were found to be processable under similar conditions provided a chain-extender was included in the composition. This was probably due to the accessability (diffusion) of the smaller 1,4 butanediol molecules to the unreacted isocyanate groups at the end of long polymer chains. It will be appreciated by those skilled in the art that it is most appropriate to balance the processing characteristics against the expected properties of the cured elastomer. In general, polyols with a molecular weight of 1000 or less did not require use of the extender. However, in the case of the caprolactone (UDC-004), the extender could be used or not (optional) depending on the improvement desired in a particular property. The polyols with molecular weight of about 2000 did require the use of the extender for processability reasons. The higher molecular weight diols also gave higher tear strengths and are thus preferred.

From the data (Table 3) it also became clear that higher molecular weight materials yielded higher tear strength values, for example, compare UDC-001 vs. -009. 1,4 butanediol is a chain-extender and thus leads to an increase in average molecular weight of resulting polyurethane.

Several PU elastomer formulations were developed for possible use in the facepiece of a new protective mask. The four formulations (see Table 4), UDC-004 (1:1.5:0.5), UDC-008 (1:2:1) and UDC-010 (1:2:1) and (1:1.5:0.5) were all reported to have zero penetration against mustard gas. Moreover, they possess a good balance of desired physical properties, i.e. hardness, tensile, tear, cut growth resistance, thermal and hydrolytic stability. Accordingly, these compounds are preferred.

The embodiments of the invention in which an exclusive property or privilege is claimed is defined as follows:

1. A process for the preparation of a polyurethane-based elastomeric material resistant to penetration by dichlorodiethyl sulphide of Shore A hardness of 55 to 75 and a tear-strength (DIE C) of 191-477 (PLI), the polyurethane-based elastomeric material having the general formula:

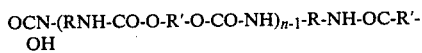
OCN-(RNH-CO-O-R'-O-CO-NH)$_{n-1}$-R-NH-OC-R'-OH the process comprising reacting a linear saturated hydroxyl-terminated polyol of the general formula

n(OH-R-OH)

with a polyisocyanate of the general formula:

n(OCN-R'-NCO)

wherein n is an integer which is the same for the polyol as for the polyisocyanate, R represents saturated, linear polyester, polyether, polycarbonate or polycaprolactone, and R' represents a polyisocyanate containing 4,4'-diphenylmethane diisocyanate as its major component.

2. A process according to claim 1, wherein a short-chain alcohol is included as a chain-extender.

3. A process according to claim 2, wherein an organometallic compound is included as a catalyst.

4. A process according to claim 3, wherein the chain-extender is 1,4-butanediol.

5. A process according to claim 4, wherein the catalyst is an organo-tin compound.

6. A process according to claim 5, wherein the organo-tin compound is diluted 20:1 with dimethyl ethyl phthalate.

7. A process according to claim 6, wherein the polyisocyanate comprises a 4,4'-diphenylmethane diisocyanate based diisocyanate.

8. A process according to claim 1, wherein the hydroxyl-terminated polyol is a saturated, linear diol of molecular weight of about 1000.

9. A process according to claim 1, wherein the hydroxyl-terminated polyol is a saturated, linear diol of molecular weight of about 2000.

10. A process for the preparation of polyurethane-based elastomeric material according to claim 1 which comprises reacting
    (a) a polycaprolactone-based diol, with
    (b) a polyisocyanate containing 4,4'-diphenylmethane diisocyanate as its major component, and
    (c) 1,4-butanediol, in an equivalent weight ratio of 1:1.5:0.5, respectively, and in the presence of dibutyl-tin diacetate diluted 20:1 with dimethyl ethyl phthalate, as catalyst.

11. A process for the preparation of a polyurethane-based elastomeric material according to claim 1 which comprises reacting
    (a) a poly(ethyleneadipate)-based diol, with
    (b) a polyisocyanate containing 4,4'-diphenylmethane diisocyanate as its major component, and
    (c) 1,4-butanediol, in an equivalent weight ratio of 1:2:1, respectively, and in the presence of dibutyl-tin diacetate diluted 20:1 with dimethyl ethyl phthalate, as catalyst.

12. A process for the preparation of a polyurethane-based elastomeric material according to claim 1, which comprises reacting
    (a) a poly(ethylene-1,4-butaneadipate)-based diol, with
    (b) a polyisocyanate containing 4,4'-diphenylmethane diisocyanate as its major component, and
    (c) 1,4'-butanediol, in an equivalent weight ratio of 1:2:1, respectively, and in the presence of dibutyl-tin diacetate diluted 20:1 with dimethyl ethyl phthalate, as catalyst.

13. A process for the preparation of a polyurethane-based elastomeric material according to claim 1, which comprises reacting
    (a) a poly(ethylene-1,4-butaneadipate)-based diol, with
    (b) a polyisocyanate containing 4,4-diphenylmethane diisocyanate as its major component, and
    (c) 1,4-butane diol, in an equivalent weight ratio of 1:1.5:0.5 and in the presence of dibutyl-tin diacetate diluted 20:1 with dimethyl ethyl phthalate, as catalyst.

14. A polyurethane-based elastomeric material prepared by a process as claimed in claim 1.

15. A polyurethane-based elastomeric material prepared by a process as claimed in claim 10.

16. A polyurethane-based elastomeric material prepared by a process as claimed in claim 11.

17. A polyurethane-based elastomeric material prepared by a process as claimed in claim 12.

18. A polyurethane-based elastomeric material prepared by a process as claimed in claim 13.

* * * * *